No. 642,636. Patented Feb. 6, 1900.
W. W. SMALL.
CHAIN POWER.
(Application filed May 4, 1898.)
(No Model.)
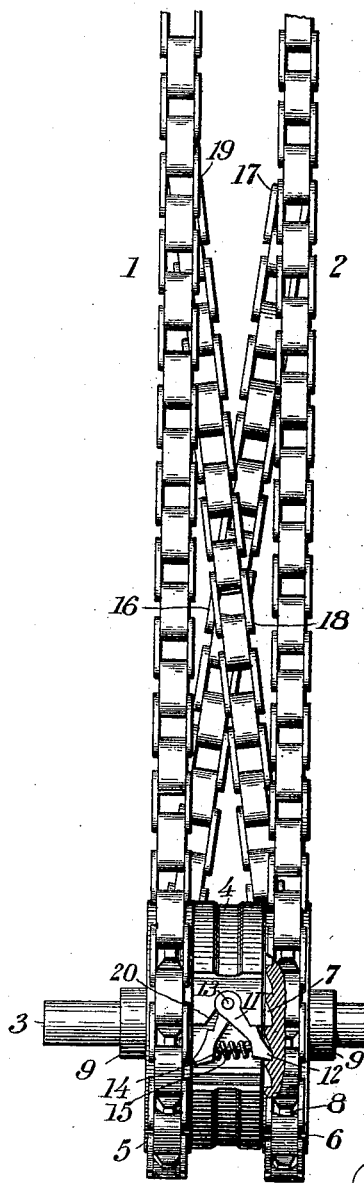
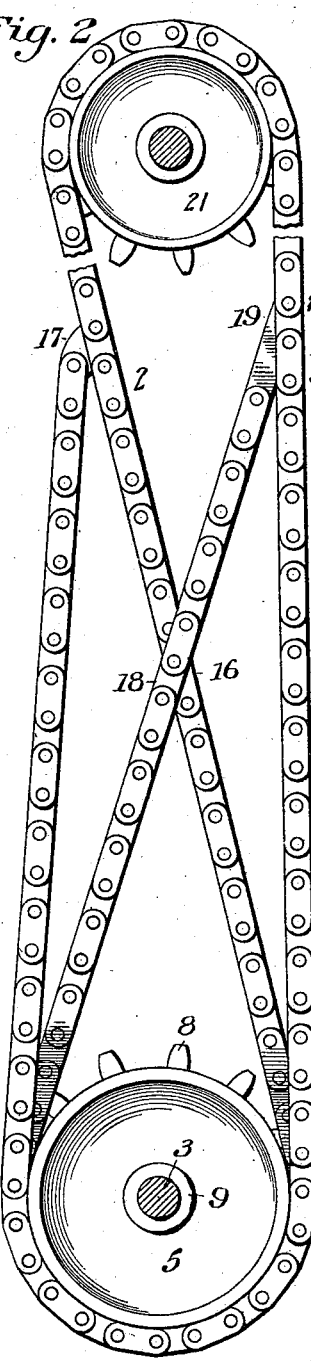
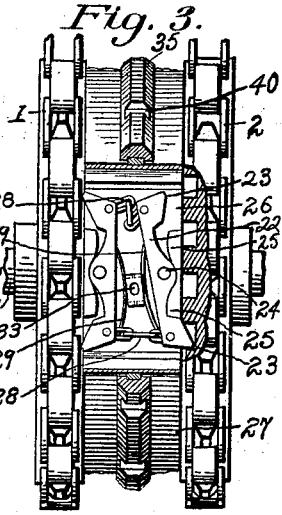
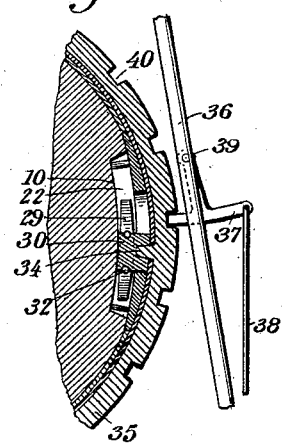
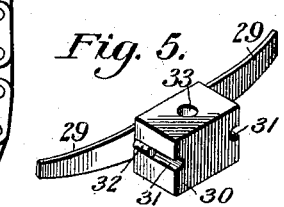
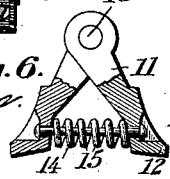
Witnesses
Harold H. Simino.
B. G. Foster.
Inventor
Walter W. Small,
By E. G. Siggers
his Attorney

UNITED STATES PATENT OFFICE.

WALTER W. SMALL, OF CHERRYFIELD, MAINE.

CHAIN-POWER.

SPECIFICATION forming part of Letters Patent No. 642,636, dated February 6, 1900.

Application filed May 4, 1898. Serial No. 679,743. (No model.)

*To all whom it may concern:*

Be it known that I, WALTER W. SMALL, a citizen of the United States, residing at Cherryfield, in the county of Washington and State of Maine, have invented a new and useful Device for Converting a Reciprocating Movement into Rotary Motion, of which the following is a specification.

This invention relates to a device or mechanism for converting reciprocating movement into rotary motion, and has for its object to provide simple and reliable means whereby, for example, motion may be communicated from a pair of reciprocating stirrups or pedals on a bicycle or other foot-propelled vehicle to the driving-wheel of a machine for imparting rotary motion thereto.

It is not to be understood that the mechanism hereinafter described is designed solely for use upon bicycles and kindred vehicles; but such mechanism is adapted to be used in a variety of ways and places or wherever it is necessary to employ simple and effective means for converting the motion of an element which reciprocates in a rectilinear, or substantially in a rectilinear path, into rotary motion.

By means of the construction hereinafter described the power applied to the final or rotary member always acts at right angles to the radius of such member, thereby producing an even application of power or leverage upon the driven member. The elements comprising the apparatus hereinafter described are also so related and arranged that the final or rotary member of the device is allowed to continue the motion imparted thereto even though the primary or reciprocating elements come to a rest.

I will now proceed to describe the invention in connection with the drawings forming a part of this specification, and in which—

Figure 1 is a front elevation of power-transmitting mechanism constructed in accordance with the present invention. Fig. 2 is a side elevation of the same with the final member or rotary member in section. Fig. 3 is an enlarged edge view of the clutch-carrier, the same being partly broken away in section to show a modification of the clutch-dogs and contiguous parts. Fig. 4 is a longitudinal section through the modified form, taken at right angles to Fig. 3. Fig. 5 is a detail perspective view showing the carrier-block and one of the dog-actuating springs of Figs. 3 and 4. Fig. 6 is an enlarged detail sectional view through the clutch-dogs of Fig. 1, showing the relation of the spreader and the stay thereto.

Similar numerals of reference designate corresponding parts in the several views.

Referring to the drawings, 1 and 2 designate flexible drivers in the form of sprocket-chains, which constitute the reciprocating elements of the mechanism and to which motion in opposite directions may be imparted in any manner and by any means. The motion imparted to said chains may be in a rectilinear path, or one substantially so. It is also within the scope of this invention to substitute for the chain illustrated in the drawings any usual or preferred form of driving band or belt operating either by a frictional or positive engagement with and upon the wheels or oscillating members of the mechanism hereinafter described.

The final or rotary element or member of the mechanism is shown in the form of a shaft or axle 3, which has mounted fast thereon a clutch-carrier 4 in the form of a collar. Mounted loosely upon the shaft 3 on opposite sides of the collar 4 are the oscillating members 5 and 6 of the mechanism, said oscillating members being in the form of ratchet-wheels, the ratchet-teeth 7 thereof being arranged in circular series upon the inner adjacent faces of said wheels and near the peripheries thereof, the said wheels being further provided with sprocket-teeth 8 for engagement with the chains 1 and 2, in case the primary or reciprocating elements are in the form of chains. Small collars or abutments 9 may be employed upon the shaft 3 for properly positioning and retaining in place the wheels 5 and 6, which rotate loosely on the shaft 3 between the collars 4 and 9.

I will now proceed to describe the mechanism whereby the oscillating members or ratchet-wheels are alternately locked upon or engaged with the shaft 3, so that the motion imparted to said wheels will be communicated by them to the final rotary member. In carrying out this part of the invention the periphery of the clutch-carrier 4 is cut away or recessed, as shown at 10, to form a seat for the clutch mechanism. The clutch mechanism shown in Fig. 1 is composed of a pair of dogs 11, which are oppositely or reversely disposed, whereby their projecting ends or engaging portions 12 extend in opposite directions, one dog being designed to engage with one of the oscillating members and the other dog with the remaining oscillating member. These dogs are mounted upon a common pivot 13, projecting outward from the base or floor of the recess 10. The free ends of the dogs are connected by means of a stay 14 in the form of a rod, pin, or bolt, the ends of which are slidingly and loosely fitted in openings in the dogs, the extremities of the stay being headed to limit the outward movement of the dogs, while allowing the dogs to swing toward each other. The inward movement of the dogs toward each other is resisted by means of a spreader 15 in the form of a coiled spring which is disposed around the stay 14, with its ends pressing outwardly against the inner surfaces of the dogs. The length of the stay 14 and the expansible properties of the spring are such that the engaging portion of one or the other dogs will project laterally beyond the adjacent side face of the clutch-carrier or collar 4 for the obvious purpose of engaging with or being engaged by the ratchet-teeth of the adjacent wheel 5 or 6, as the case may be.

In view of the foregoing it will be understood that when the wheels 5 and 6 are rotated in opposite directions the teeth of the wheel which is rotating in what may be termed a "backward" direction, or, in other words, in a direction the reverse from that in which the final or rotary member 3 is being driven, acting upon the adjacent dog, will throw said dog away from them and cause it to occupy a position within the planes of the opposite side faces of the clutch-carrier or collar 4. In this movement of one of the dogs, however, the other dog, through the medium of the spreader or spring 15, is thrown in the same direction as the first dog, causing the engaging portion of said dog to be projected laterally beyond the side face of the collar 4, whereupon it is caught and engaged by the teeth of the oscillating member or wheel on that side of the collar 4, and as said wheel is rotating in a direction the reverse of the first-named wheel, or, in other words, in the same direction as the final rotary member, it will be seen that said oscillating member or ratchet-wheel will, acting through its respective dog, take up and carry with it the clutch-carrier or collar 4, which, being fast upon the shaft 3, will communicate a corresponding movement to said shaft or final rotary member.

By reference to Figs. 1 and 2 it will be seen that after the flexible driver 1 encircles or passes around its oscillating member or wheel 5 the return portion 16 of said driver is connected to the other flexible driver 2 at any suitable point, as 17. In the same manner the return portion 18 of the other flexible driver 2 is attached, as at 19, to the first-mentioned driver 1. By means of this arrangement as the driver 1 is drawn, moved, or actuated in one direction it, through the medium of its return portion, draws, moves, or actuates the other driver in the opposite direction, and vice versa.

In order to limit the outward movements of the clutch-dogs 11, one portion of the recess 10 is made somewhat shallower than the remainder of the recess to form reversely beveled or inclined shoulders 20, with which the dogs come in contact when their engaging portions or extremities have moved outward far enough to be reliably engaged by the ratchet-wheels or oscillating members. Should both drivers or reciprocating elements come to a rest and both of the oscillating members or ratchet-wheels be held stationary as a result, the final or rotary member 3 can continue its motion on account of the adaptability of both clutch-dogs to move inward by compressing the spring 15 until the engaging portions or extremities of the dogs both lie within the planes of the side faces of the clutch-carrier. Where it is convenient and the space or room permits, the chains or flexible drivers may be passed around a pulley or sprocket-wheel, as shown at 21, or the ends of the chains or drivers where the reciprocating movement of the drivers is not too great may be attached to the opposite ends of a walking-beam, which is, in effect, a segment of a pulley.

Another very convenient form of clutch mechanism is illustrated in Figs. 3, 4, and 5, and this form of clutch mechanism, which will now be described, is useful and necessary where it is important or desirable to reverse the direction of rotation of the final rotary member 3. In this reversing-gear the clutches are in the form of double-ended dogs 22, two of said dogs being employed, and each provided with two engaging portions or extremities 23. These dogs are mounted upon independent pivots 24, and their oscillating movements are limited by stop-shoulders 25. The dogs 22 are arranged in a peripheral recess 26 in a clutch-carrier or collar 4, similar to that above described, but are connected in a different manner, two connections being employed and arranged at the opposite ends of the dogs. These connections (indicated at 28) are shown for convenience as composed of chains. The only essential feature of said connections, however, is that they be flexible laterally, and they should be longitudinally inelastic for the purpose of limiting the relative outward movements of the ends of the dogs, the outward movement being just sufficient to allow the end of one dog to project into engagement with one of the ratchet-wheels 5 or 6, while the opposite dog is withdrawn to admit of the backward movement of the other ratchet-wheel, the operation being exactly similar to that described in connection with the dogs 11.

In order to reverse the positions of the dogs or force apart the opposite ends thereof when it is desired to reverse the direction of the rotation of the shaft 3, I employ an adjustable tension device consisting of a pair of bow-springs 29, arranged upon the opposite sides or a carrier-block 30, which is adapted, by means hereinafter described, to be shifted longitudinally between the dogs. The block 30 is provided in its opposite sides with cross grooves or sockets 31, and each spring is provided with a pair of stud projections 32, which work in said sockets. The springs 29 are located on opposite sides of the block 30, and the studs 32 enter said sockets from opposite sides and project toward each other, thus allowing the springs to tilt or rock with respect to each other and the block 30, the extremities of said springs being deflected outwardly and bearing against the inner adjacent surfaces of the dogs, as clearly shown in Fig. 3. The carrier-block 30 is further provided with a socket 33 for the reception of a pin 34, projecting inwardly from a shifting band 35, which encircles the collar 27 and is suitably guided thereon. It will now be seen that by shifting or sliding the band 35 partially around the collar 27 the block 30 will be correspondingly shifted back and forth between the dogs. When the block 30, with its springs 29, is shifted toward one end of the dogs, the engaging portions at such ends will be forced apart, so as to straighten out the connection 28 at that end, and when the block is shifted in the opposite direction the opposite ends of the dogs will be thrown outward in a manner readily understood. The sliding or shifting of the band 35 may be effected in any convenient manner, the means illustrated comprising a rod 36, carrying a latch 37, operated by a suitable connection 38, the said latch being pivotally mounted, as at 39, on the rod 36 and adapted to be thrown into engagement with any one of the series of notches 40 on the band 35.

From the foregoing description it will be seen that the motion of the flexible drivers is imparted to the rotary member in such a manner as to drive said rotary member continually in the same direction, which direction is governed and controlled by the positions of the clutch-dogs, and which position may be shifted by means of the reversing mechanism described. It will also be seen that the application of power to the oscillating members and subsequently to the final rotary member is always in a direction at right angles to the radius of the oscillating members. By crossing the flexible drivers and connecting them one to the other, as shown and described, motion in one direction applied to one of the drivers will effect a movement of the other driver in the opposite direction, and vice versa, thus dispensing with auxiliary means for reversing the direction of movement of the flexible drivers with respect to each other. The arrangement last referred to will be found of special advantage in bicycle driving-gear where the stirrups or pedals move in paths which are rectilinear, or substantially so, and where otherwise no other provision is made for causing said stirrups or pedals to reciprocate alternately in opposite directions.

I do not care to be limited to the details of construction and arrangement of parts hereinabove set forth, but reserve to myself the right to change, modify, or vary the construction within the scope of this invention. It will therefore be apparent that changes in the form, proportion, and minor details of construction may be resorted to without departing from the spirit or sacrificing any of the advantages of the invention.

What I claim as new, and desire to secure by Letters Patent, is—

1. In a device for converting reciprocating movement into rotary motion, in combination, a flexible driver or reciprocating element having different portions thereof moving in opposite directions, a rotary driven member, oscillating members having a normally-loose engagement therewith, and clutch mechanism between the oscillating members having axial movement in a plane parallel to the axis of the rotary member for alternately and automatically engaging said oscillating members one at a time and permitting said oscillating members to move simultaneously in opposite directions, the arrangement being such that the rotary member is continuously driven in the same direction, substantially as described.

2. In a device for converting reciprocating movement into rotary motion, in combination, a flexible driver or reciprocating element having different portions thereof arranged to move simultaneously in opposite directions, a rotary member, oscillating members loose thereon and engaged by the different portions of the flexible driver, a clutch-carrier interposed between said oscillating members and fast on the rotary member, and an automatic clutch on said carrier comprising oppositely and independently movable clutch members having their axes at right angles to the axis of the rotary member arranged to alternately engage the oscillating members, whereby continuous rotary motion is imparted to the rotary member in the same direction, substantially as described.

3. In a device for converting reciprocating movement into rotary motion, in combination, a rotary member, oscillating members normally loose thereon, a clutch-carrier fast on said rotary member and interposed between the oscillating members, an automatic clutch on said carrier which alternately engages said oscillating members and which is common to both members, and a pair of flexible drivers or reciprocating elements each of which engages one of the oscillating members, and has its return portion connected to the other reciprocating element, substantially as described.

4. In a device for converting reciprocating movement into rotary motion, the combination with a rotary member, of a pair of oscillating members loosely mounted thereon, a clutch-carrier fast on said rotary member and interposed between the oscillating members, flexible reciprocating members arranged to actuate the oscillating members simultaneously in opposite directions, and clutch mechanism on the clutch-carrier comprising oppositely-movable dogs, and a spreader for urging and yieldingly holding said dogs apart, substantially as described.

5. In a device for converting reciprocating movement into rotary motion, in combination, a rotary driven member, oscillating members loose thereon, a clutch-carrier fast on said rotary member between the oscillating members, reciprocating members arranged to actuate said oscillating members simultaneously in opposite directions, and clutch mechanism on the clutch-carrier comprising a pair of oppositely-movable dogs, a spreader for urging and yieldingly holding said dogs apart, and means for limiting the movements of said dogs in opposite directions, substantially as described.

6. In a device for converting reciprocating movement into rotary motion, in combination, a rotary member, oscillating members loosely mounted thereon, a clutch-carrier fast on said rotary member between the oscillating members, flexible driving devices for simultaneously actuating said oscillating members in opposite directions, clutch mechanism on said carrier comprising a pair of oppositely-movable dogs, a spreader for forcing and yieldingly holding said dogs apart, a stay for limiting the relative outward movement of said dogs, and means for reversing the disposition of said dogs for changing the direction of the rotation of the rotary member, substantially as described.

7. In a device for converting reciprocating movement into rotary motion, in combination, a rotary member, oscillating members loose thereon, a clutch-carrier fast on said rotary member between the oscillating members, reciprocating members for actuating the oscillating members simultaneously in opposite directions, and clutch mechanism on said carrier comprising a pair of oppositely-movable clutch-dogs, spreading means for yieldingly holding said dogs, limiting means for governing the relative movement of said dogs away from each other, and stop-shoulders on the carrier with which the dogs engage, substantially as described.

WALTER W. SMALL.

Witnesses:
ALVAH F. FARNSWORTH,
MABEL P. SMALL.